(12) United States Patent
Xue et al.

(10) Patent No.: US 10,507,522 B2
(45) Date of Patent: Dec. 17, 2019

(54) PRECAST HOLE SCAB REMOVING DEVICE

(71) Applicant: CITIC Dicastal CO., LTD., Qinhuangdao, Hebei (CN)

(72) Inventors: Bowen Xue, Qinhuangdao (CN); Jiandong Guo, Qinhuangdao (CN)

(73) Assignee: CITIC DICASTAL CO., LTD., Qinhuangdao, Hebei (CN)

( * ) Notice: Subject to any disclaimer, the term of this patent is extended or adjusted under 35 U.S.C. 154(b) by 252 days.

(21) Appl. No.: 15/604,447

(22) Filed: May 24, 2017

(65) Prior Publication Data

US 2017/0348769 A1 Dec. 7, 2017

(30) Foreign Application Priority Data

Jun. 1, 2016 (CN) .......................... 2016 1 0381215

(51) Int. Cl.
*B22D 31/00* (2006.01)
*B23D 79/02* (2006.01)

(52) U.S. Cl.
CPC ............ *B22D 31/002* (2013.01); *B23D 79/02* (2013.01); *Y10T 83/2133* (2015.04); *Y10T 83/2142* (2015.04); *Y10T 225/386* (2015.04)

(58) Field of Classification Search
CPC .... B26D 2007/1809; B26D 2007/1872; B26D 2007/189; B26D 7/18–1863;
(Continued)

(56) References Cited

U.S. PATENT DOCUMENTS

| 2,371,565 | A | * | 3/1945 | Whistler | ................. | B21D 28/34 29/465 |
| 4,030,390 | A | * | 6/1977 | Heiting | .................. | B26D 7/015 83/123 |

FOREIGN PATENT DOCUMENTS

| CN | 202438679 U | 9/2012 |
| CN | 202621503 U | 12/2012 |

(Continued)

OTHER PUBLICATIONS

JP9-150315 English Translation; Watanabe Y,; Jun. 10, 1997.*
CN204658020 English Translation; Guo J; Sep. 23, 2015.*
JP2003-275856 English Translation; Horiuchi M; Sep. 30, 2003.*

*Primary Examiner* — Laura M Lee
(74) *Attorney, Agent, or Firm* — Syncoda LLC; Feng Ma

(57) ABSTRACT

A precast hole scab removing device is provided. The precast hole scab removing device is composed of a stand, floating columns, ejector pins, an air cylinder, clamp cylinders, supporting poles and the like. In use, a hole I and a hole II in a workpiece respectively match with a tapered part of a left floating column and a tapered part of a right floating column; by pressing down the workpiece, locating parts of the workpiece simultaneously match with the top end of a supporting pole I, the top end of a supporting pole II and the top end of a supporting pole III, a clamp cylinder I, a clamp cylinder II and a clamp cylinder III press the workpiece tightly, and at the moment, the workpiece is completely located; the air cylinder lifts down a lifting plate and the ejector pins through two guide pillars, the ejector pins are pressed into holes, in which scabs need to be removed, of the workpiece; and therefore, the scabs can be ejected out of the workpiece. The precast hole scab removing device can remove the scabs of precast holes of casting workpieces in use, the removing efficiency is high, the scabs are removed cleanly, and additionally, the precast hole scab removing device has the characteristics of high automation degree, simple structure, low manufacturing costs and the like.

1 Claim, 4 Drawing Sheets

(58) Field of Classification Search
CPC ............ Y10T 225/386; Y10T 83/2122; Y10T 83/2133; Y10T 83/2142; B23Q 3/06; B23Q 3/08; B22D 31/00; B23D 79/02
USPC .................... 225/105; 83/123, 132, 945, 549
See application file for complete search history.

(56) References Cited

FOREIGN PATENT DOCUMENTS

| | | |
|---|---|---|
| CN | 203831138 U | 9/2014 |
| CN | 204658020 U | 9/2015 |
| CN | 105458212 A | 4/2016 |
| CN | 205660139 U | 10/2016 |
| JP | H09150315 A | 6/1997 |
| JP | 2003275856 A | 9/2003 |
| JP | 2006061956 A | 3/2006 |

\* cited by examiner

PRECAST HOLE SCAB REMOVING DEVICE

CROSS-REFERENCE TO RELATED APPLICATIONS

This application is filed based upon and claims priority to Chinese Patent Application No. 201610381215.1, filed on Jun. 1, 2016, the entire contents of which are incorporated herein by reference.

TECHNICAL FIELD

The disclosure relates to a precast hole scab removing device, and in particular to a device for removing precast hole scabs of high-pressure casting workpieces.

BACKGROUND

An automobile cylinder head generally is cast in a high pressure forming manner, and during casting, it usually generates scabs at positions of precast holes due to an interval existing between an upper ejector pin and a lower ejector pin. If the scabs are not removed in this working procedure, they will influence the machining efficiency and the yield of the following working procedures. Currently, there is no fast and effective precast hole scab removing device.

SUMMARY

A precast hole scab removing device is provided, which may capable of, among other things, removing scabs of precast holes of casting workpieces.

In one embodiment of the disclosure, a precast hole scab removing device is composed of a stand, a base plate, a left spring, a left sliding sleeve, a left floating column, ejector pins, a lifting plate, guide sleeves, guide pillars, an air cylinder, a clamp cylinder I, a supporting pole I, a right floating column, a right sliding sleeve, a right spring, a supporting pole II, a clamp cylinder II, a clamp cylinder III and a supporting pole III. The base plate is fixed on a platform of the stand; the left sliding sleeve and the right sliding sleeve are fixed on the base plate, the left floating column matches with the left sliding sleeve, and the right floating column matches with the right sliding sleeve; the left spring is mounted in the left sliding sleeve and is positioned below the left floating column, and the right spring is mounted in the right sliding sleeve and is positioned below the right floating column; the supporting pole I, the supporting pole II and the supporting pole III are respectively fixed at corresponding positions of the base plate and respectively correspond to locating points of a workpiece; the clamp cylinder I, the clamp cylinder II and the clamp cylinder III are also fixed on corresponding positions of the base plate, and clamping points of the clamp cylinder I, the clamp cylinder II and the clamp cylinder III are respectively placed above the supporting pole I, the supporting pole II and the supporting pole III; a plurality of ejector pins are fixed on the lower surface of the lifting plate, and the positions of the ejector pins respectively correspond to positions, at which scabs need to be removed, on the workpiece; and two guide pillars are fixed at the upper end of the lifting plate, two guide sleeves matching with the two guide pillars are fixed on a head plate of the stand, the air cylinder is also fixed on the head plate of the stand, and an output end of the air cylinder is connected with the top end of the lifting plate.

During actual use, a hole I and a hole II in the workpiece respectively match with a tapered part of the left floating column and a tapered part of the right floating column; by pressing down the workpiece, locating parts of the workpiece simultaneously match with the top end of the supporting pole I, the top end of the supporting pole II and the top end of the supporting pole III, the clamp cylinder I, the clamp cylinder II and the clamp cylinder III press the workpiece tightly, and at the moment, the workpiece is completely located; the air cylinder lifts down the lifting plate and the ejector pins through the two guide pillars, the ejector pins are pressed into holes, in which scabs need to be removed, of the workpiece; and therefore, the scabs can be ejected out of the workpiece.

The precast hole scab removing device can remove the scabs of precast holes of casting workpieces in use, the removing efficiency is high, the scabs are removed cleanly, and additionally, the precast hole scab removing device has the characteristics of high automation degree, simple structure, low manufacturing costs and the like.

Figure 1:
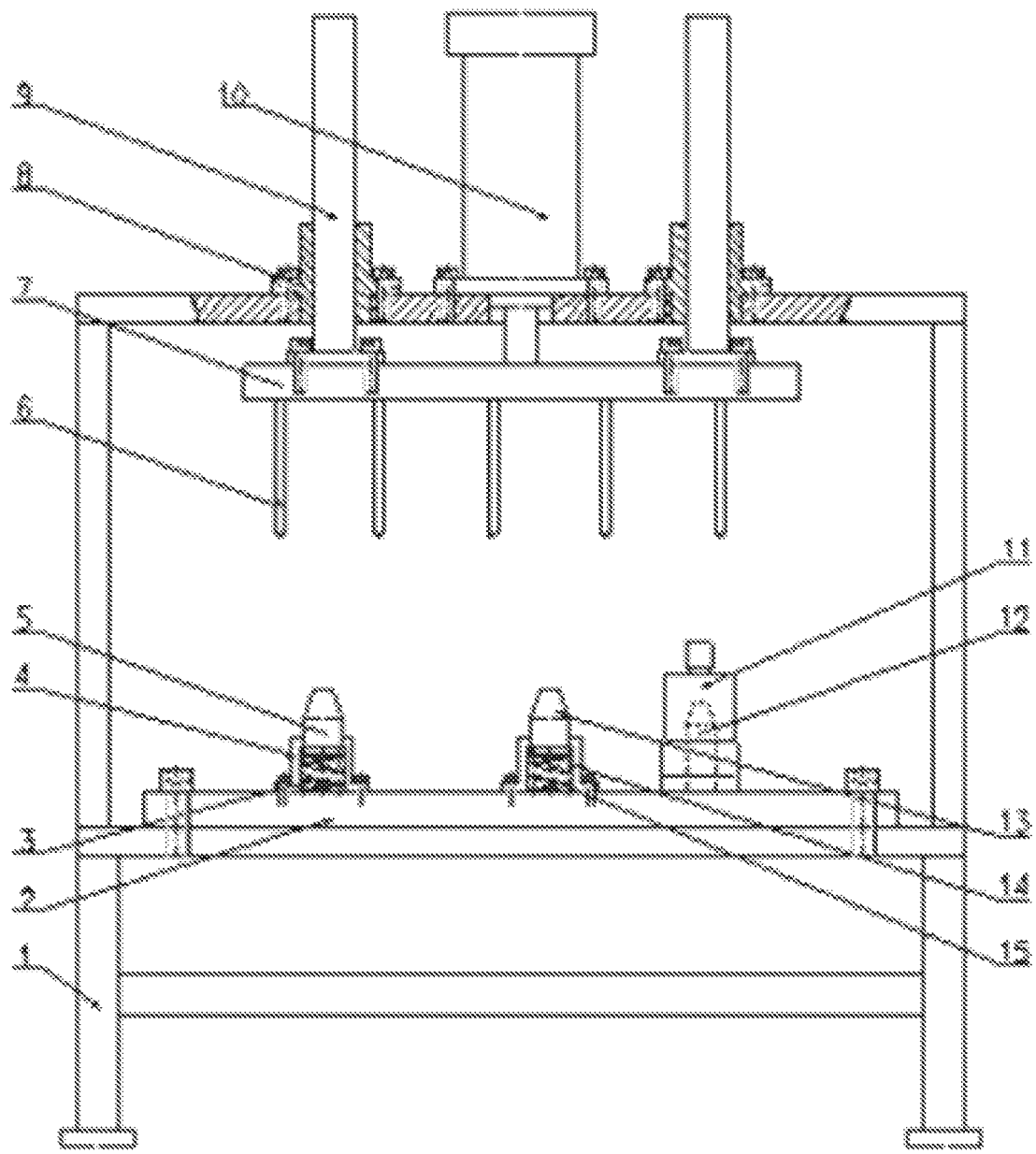
FIG. 1 is a front view of a precast hole scab removing device provided by the disclosure.
Figure 2:
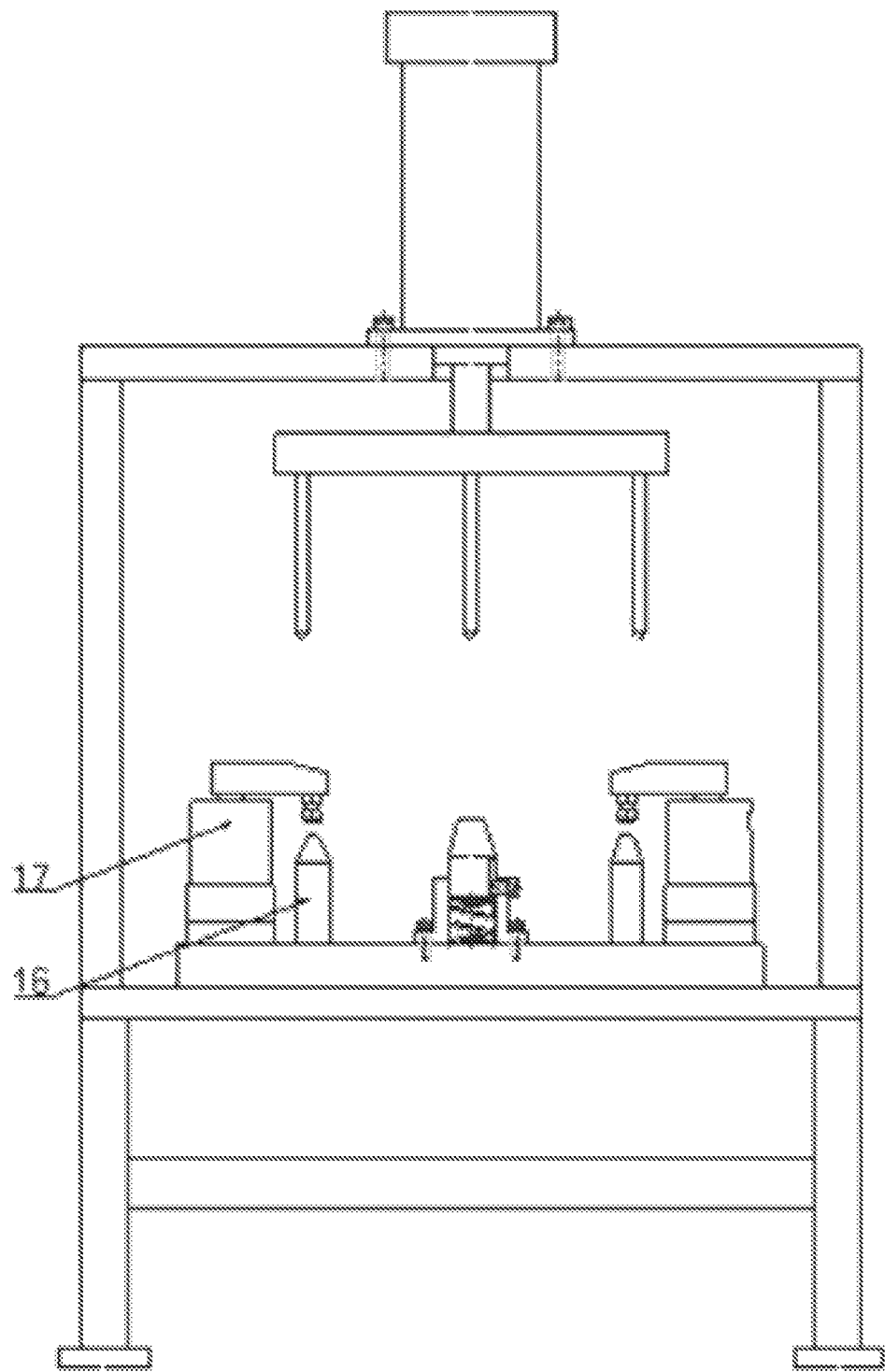
FIG. 2 is a left view of a precast hole scab removing device provided by the disclosure.
Figure 3:
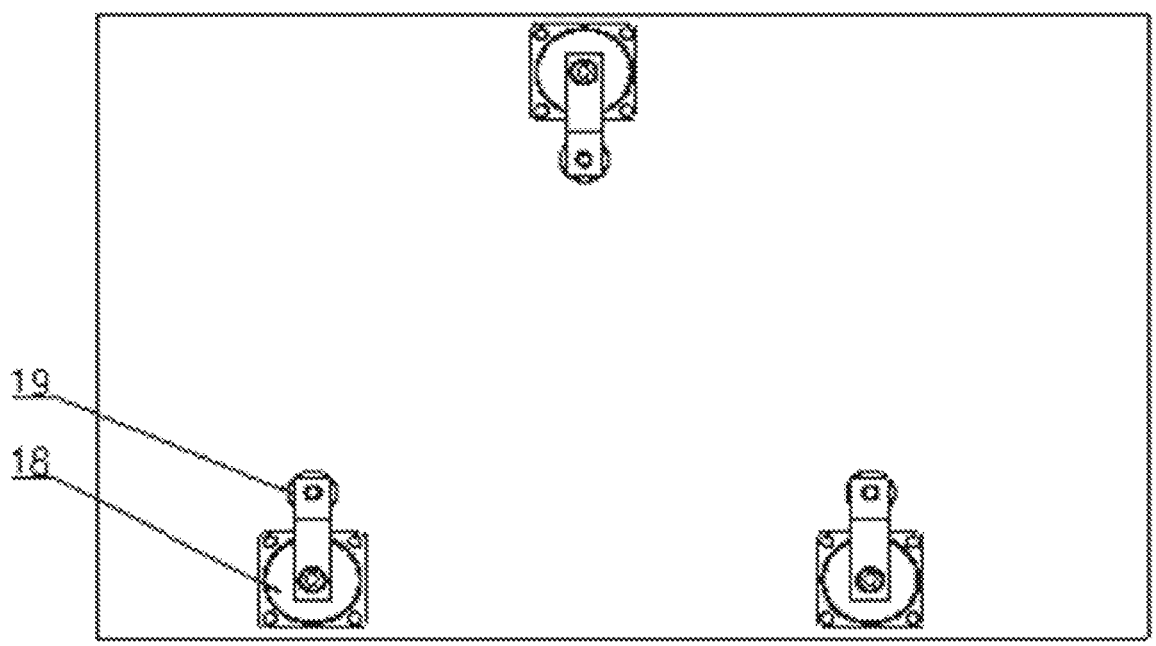
FIG. 3 is a local top view of a precast hole scab removing device provided by the disclosure.
Figure 4:
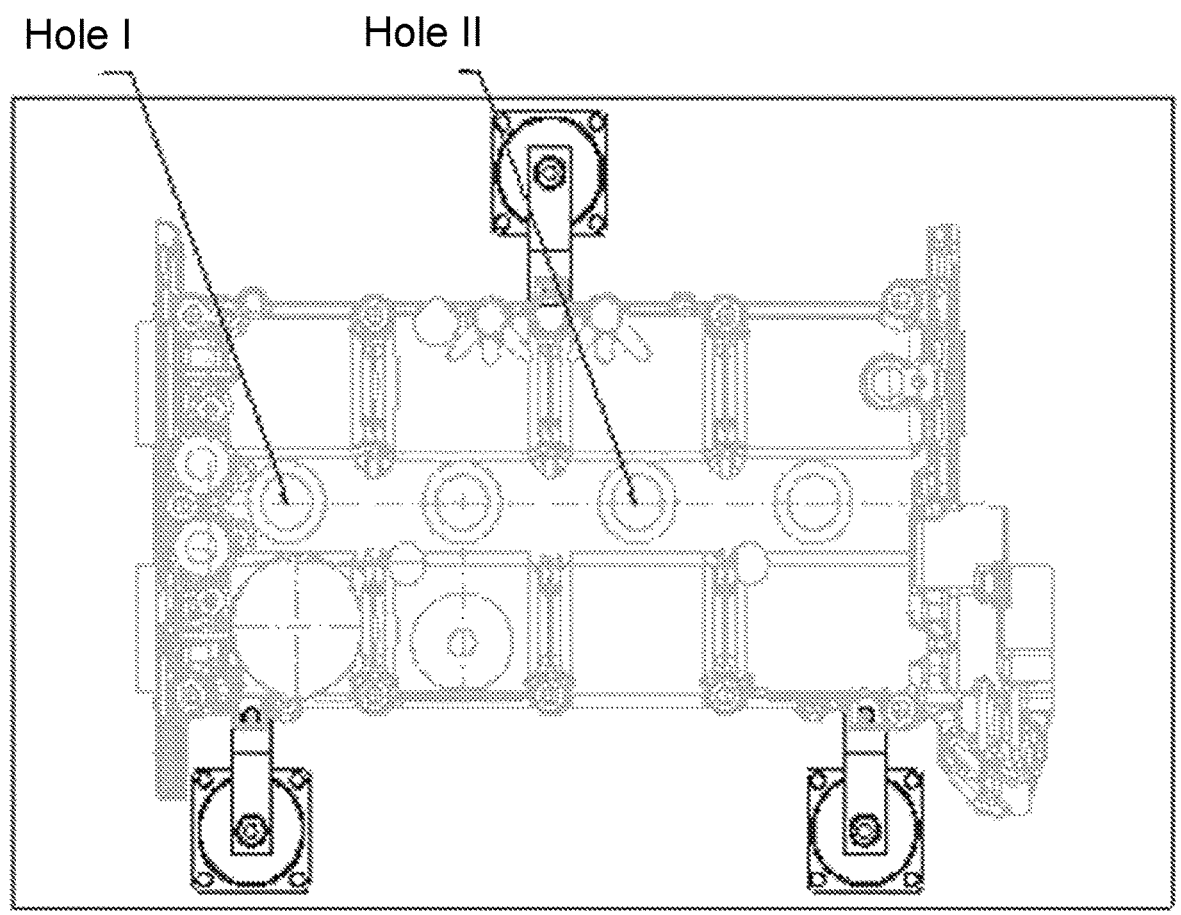
FIG. 4 is a local top view of a precast hole scab removing device provided by the disclosure after a workpiece is clamped.

In the figures, numerical symbols are as follows: 1—stand, 2—base plate, 3—left spring, 4—left sliding sleeve, 5—left floating column, 6—ejector pin, 7—lifting plate, 8—guide sleeve, 9—guide pillar, 10—air cylinder, 11—clamp cylinder I, 12—supporting pole I, 13—right floating column, 14—right sliding sleeve, 15—right spring, 16—supporting pole II, 17—clamp cylinder II, 18—clamp cylinder III, and 19—supporting pole III.

DETAILED DESCRIPTION

In the following, the details and working conditions of a specific device provided by the disclosure are described in combination with figures.

A precast hole scab removing device is composed of a stand 1, a base plate 2, a left spring 3, a left sliding sleeve 4, a left floating column 5, ejector pins 6, a lifting plate 7, guide sleeves 8, guide pillars 9, an air cylinder 10, a clamp cylinder I 11, a supporting pole I 12, a right floating column 13, a right sliding sleeve 14, a right spring 15, a supporting pole II 16, a clamp cylinder II 17, a clamp cylinder III 18 and a supporting pole III 19. The base plate 2 is fixed on a platform of the stand 1; the left sliding sleeve 4 and the right sliding sleeve 14 are fixed on the base plate 2, the left floating column 5 matches with the left sliding sleeve 4, and the right floating column 13 matches with the right sliding sleeve 14; the left spring 3 is mounted in the left sliding sleeve 4 and is positioned below the left floating column 5, and the right spring 15 is mounted in the right sliding sleeve 14 and is positioned below the right floating column 13; the supporting pole I 12, the supporting pole II 16 and the supporting pole III 19 are respectively fixed at corresponding positions of the base plate 2 and respectively correspond to locating points of a workpiece; the clamp cylinder I 11, the clamp cylinder II 17 and the clamp cylinder III 18 are also fixed on corresponding positions of the base plate 2, and clamping points of the clamp cylinder I 11, the clamp cylinder II 17 and the clamp cylinder III 18 are respectively placed above the supporting pole I 12, the supporting pole II 16 and the supporting pole III 19; a plurality of ejector pins 6 are fixed on the lower surface of the lifting plate 7, and the positions of the ejector pins 6 respectively correspond to positions, at which scabs need to be removed, on the workpiece; and two guide pillars 9 are fixed at the upper end of the lifting plate 7, two guide sleeves 8 matching with the two guide pillars 9 are fixed on a head plate of the stand 1, the air cylinder 10 is also fixed on the head plate of the stand 1, and an output end of the air cylinder 10 is connected with the top end of the lifting plate 7.

During working, a hole I and a hole II in the workpiece respectively match with a tapered part of the left floating column 5 and a tapered part of the right floating column 13; by pressing down the workpiece, locating parts of the workpiece simultaneously match with the top end of the supporting pole I 12, the top end of the supporting pole II 16 and the top end of the supporting pole III 19, the clamp cylinder I 11, the clamp cylinder II 17 and the clamp cylinder III 18 press the workpiece tightly, and at the moment, the workpiece is completely located; the air cylinder 10 lifts down the lifting plate 7 and the ejector pins 6 through the two guide pillars 9, the ejector pins 6 are pressed into holes, in which scabs need to be removed, of the workpiece; and therefore, the scabs can be ejected out of the workpiece.

The invention claimed is:

1. A precast hole scab removing device, which comprises a stand (1), a base plate (2), a left spring (3), a left sliding sleeve (4), a left floating column (5), a plurality of ejector pins (6), a lifting plate (7), two guide sleeves (8), two guide pillars (9), an air cylinder (10), a clamp cylinder I (11), a supporting pole I (12), a right floating column (13), a right sliding sleeve (14), a right spring (15), a supporting pole II (16), a clamp cylinder II (17), a clamp cylinder III (18) and a supporting pole III (19), wherein the base plate (2) is fixed on a platform of the stand (1); the left sliding sleeve (4) and the right sliding sleeve (14) are fixed on the base plate (2), the left floating column (5) matches with the left sliding sleeve (4), and the right floating column (13) matches with the right sliding sleeve (14); the left spring (3) is mounted in the left sliding sleeve (4) and is positioned below the left floating column (5), and the right spring (15) is mounted in the right sliding sleeve (14) and is positioned below the right floating column (13); the supporting pole I (12), the supporting pole II (16) and the supporting pole III (19) are respectively fixed at corresponding positions of the base plate (2) and respectively correspond to locating points of a workpiece; the clamp cylinder I (11), the clamp cylinder II (17) and the clamp cylinder III (18) are also fixed on corresponding positions of the base plate (2), and clamping points of the clamp cylinder I (11), the clamp cylinder II (17) and the clamp cylinder III (18) are respectively placed above the supporting pole I (12), the supporting pole II (16) and the supporting pole III (19); the plurality of ejector pins (6) are fixed on the lower surface of the lifting plate (7), and the positions of the ejector pins (6) respectively correspond to positions, at which scabs need to be removed, on the workpiece; and the two guide pillars (9) are fixed at the upper end of the lifting plate (7), the two guide sleeves (8) matching with the two guide pillars (9) are fixed on a head plate of the stand (1), the air cylinder (10) is also fixed on the head plate of the stand (1), and an output end of the air cylinder (10) is connected with the top end of the lifting plate (7).

* * * * *